United States Patent
Petersen et al.

(10) Patent No.: US 10,957,020 B2
(45) Date of Patent: Mar. 23, 2021

(54) SYSTEMS AND METHODS FOR FRAME TIME SMOOTHING BASED ON MODIFIED ANIMATION ADVANCEMENT AND USE OF POST RENDER QUEUES

(71) Applicant: NVIDIA CORPORATION, Santa Clara, CA (US)

(72) Inventors: Thomas Albert Petersen, San Jose, CA (US); Ankan Banerjee, Pune (IN); Shishir Goyal, Pune (IN); Sau Yan Keith Li, San Jose, CA (US); Lars Nordskog, Corte Madera, CA (US); Rouslan Dimitrov, Santa Clara, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 84 days.

(21) Appl. No.: 16/208,390

(22) Filed: Dec. 3, 2018

(65) Prior Publication Data

US 2019/0172181 A1 Jun. 6, 2019

Related U.S. Application Data

(60) Provisional application No. 62/594,445, filed on Dec. 4, 2017.

(51) Int. Cl.
*G06T 5/00* (2006.01)
*G06T 15/00* (2011.01)
(Continued)

(52) U.S. Cl.
CPC ............ *G06T 5/002* (2013.01); *G06F 9/3877* (2013.01); *G06T 1/20* (2013.01); *G06T 13/00* (2013.01);
(Continued)

(58) Field of Classification Search
CPC ....... G06T 5/002; G06T 13/00; G06T 15/005; G06T 1/20; G06T 13/20; G06T 19/006;
(Continued)

(56) References Cited

U.S. PATENT DOCUMENTS

2004/0151372 A1* 8/2004 Reshetov ............. G06T 11/001
382/166
2006/0132491 A1* 6/2006 Riach ..................... G09G 5/001
345/505
(Continued)

*Primary Examiner* — Nimesh Patel
(74) *Attorney, Agent, or Firm* — Zilka-Kotab, P.C.

(57) ABSTRACT

Embodiments of the present invention provide end-to-end frame time synchronization designed to improve smoothness for displaying images of 3D applications, such as PC gaming applications. Traditionally, an application that renders 3D graphics functions based on the assumption that the average render time will be used as the animation time for a given frame. When this condition is not met, and the render time for a frame does not match the average render time of prior frames, the frames are not captured or displayed at a consistent rate. This invention enables feedback to be provided to the rendering application for adjusting the animation times used to produce new frames, and a post-render queue is used to store completed frames for mitigating stutter and hitches. Flip control is used to sync the display of a rendered frame with the animation time used to generate the frame, thereby producing a smooth, consistent image.

17 Claims, 10 Drawing Sheets

(51) Int. Cl.
*G06F 9/38* (2018.01)
*G06T 1/20* (2006.01)
*G06T 13/20* (2011.01)
*G09G 5/00* (2006.01)
*G06T 13/00* (2011.01)

(52) U.S. Cl.
CPC ............ *G06T 13/20* (2013.01); *G06T 15/005* (2013.01); *G09G 5/00* (2013.01)

(58) Field of Classification Search
CPC ......... G06T 1/60; G06T 11/001; G06T 15/04; G06T 2200/04; G06T 2215/16; G06T 11/40; G06T 15/503; G06T 19/20; G06T 2207/20132; G06T 2219/2016; G06T 3/0018; G06T 5/006; G06T 13/80; G06T 15/00; G06T 15/60; G09G 5/00; G09G 5/12; G09G 5/363; G09G 2340/0435; G09G 2350/00; G09G 5/391; G09G 5/393; G09G 5/42; G06F 9/3877; G06F 3/14; G06F 3/0484; G06F 3/017; G06F 9/3851; G06F 9/3879; G07F 17/3211; G07F 17/323; G07F 17/3206; G07F 17/3241; G07F 17/3204; G07F 17/3209; G07F 17/3218; G07F 17/3225; G07F 17/3237; G07F 7/08; G06K 9/00671; G06K 9/00664; G06K 9/00711; G06K 9/00597; G06K 19/06037; A63F 2300/66; A63F 2300/69; A63F 13/213; A63F 13/00; A63F 13/53; A63F 13/31; A63F 13/426; A63F 2009/2435; A63F 2009/2458; A63F 2300/8082; A63F 13/235; A63F 13/52; A63F 13/77; A63F 2300/1093

See application file for complete search history.

(56) References Cited

U.S. PATENT DOCUMENTS

| | | | |
|---|---|---|---|
| 2007/0070074 A1* | 3/2007 | Jiang | G09G 5/399 345/539 |
| 2008/0072166 A1* | 3/2008 | Reddy | G06T 13/00 715/764 |
| 2010/0043044 A1* | 2/2010 | Li | H04N 19/154 725/118 |
| 2012/0219021 A1* | 8/2012 | Lippey | H04N 9/3188 372/10 |
| 2013/0222430 A1* | 8/2013 | Bredno | G06T 7/0014 345/634 |
| 2016/0127641 A1* | 5/2016 | Gove | H04N 5/23206 348/143 |
| 2017/0053620 A1* | 2/2017 | Law | G06T 1/20 |
| 2017/0352322 A1* | 12/2017 | Spence | G09G 5/12 |
| 2018/0063440 A1* | 3/2018 | Kopf | G06T 5/002 |
| 2018/0096464 A1* | 4/2018 | Kobayashi | H04N 5/145 |
| 2018/0173410 A1* | 6/2018 | Chen | G06F 3/04847 |

* cited by examiner

PRIOR ART

PRIOR ART

SYSTEMS AND METHODS FOR FRAME TIME SMOOTHING BASED ON MODIFIED ANIMATION ADVANCEMENT AND USE OF POST RENDER QUEUES

CROSS-REFERENCE TO RELATED APPLICATIONS

This application claims the benefit of and priority to provisional patent application, Ser. No. 62/594,445, entitled "FRAME TIME SMOOTHING BASED ON MODIFIED ANIMATION ADVANCEMENT AND POST RENDER QUEUES," with filing date Dec. 4, 2017, and hereby incorporated by reference in its entirety.

FIELD

Embodiments of the present invention generally relate to the field of computer graphics. More specifically, embodiments of the present invention relate to systems and methods for generating better display data for 3D applications.

BACKGROUND

Traditionally, a game engine produces frames based on the assumption that the average time taken to render a frame will be used as the animation time for a given frame, with the expectation that frames will be rendered and captured at a consistent rate, and that those frames will be displayed at the same rate. Therefore, the animation time of a frame coincides with a display time for the frame. When these conditions are not met, and the render time for a frame does not match the average render time of prior frames, the frames may not be captured or displayed at a consistent rate. This causes the graphical output generated by the game or application to exhibit stutter, which greatly detracts from the gaming experience.

Display artifacts like stutter and hitches can be distracting to the user experience. Stutter refers to the display of frames in an inconsistent manner that results in an image that appears to speed up and slow down intermittently. Each rendered frame is a momentary snap-shot of some physical movement within a 3D environment in real-time, and the animation time represents the time between snap-shots. For example, stutter will occur when a first frame is displayed for 1 ms, and a second frame is displayed for 5 ms, where each frame represents motion based on a 3 ms time step.

The technical demands of modern games often outpace the computing power of commonly available hardware, and as such, a user's computer system may be unable to render frames in a consistent manner. If the animation time between frames is too long, the rendered product will appear to freeze or slow down momentarily. This slowdown may be referred to as micro-stutter, and can be very detrimental to the user experience, making controlling the application accurately difficult or impossible. In other words, frames should be captured at a consistent rate, and the frames should be played back at the same rate to provide an optimal user experience.

FIGS. 1A-1C are frame timing diagrams depicting frame timing issues for exemplary frames f(n) that impact the smoothness of a displayed image. In FIG. 1A, a frame timing diagram 10 illustrates the timing of frame sets 11, 12, and 13. Source frames 11 of a 24 fps video are consistently captured 41.6 ms apart. When the frames are presented 50 ms apart, for example, as depicted by frame set 12, the timing of the display of the frames does not match the capture time of the frames, and therefore individual frames are displayed for a longer period of time. This causes the resultant image to appear to be moving in slow motion compared to the intended source image of source frames 11. Frames 13 are presented with inconsistent timing, causing the resultant image to slow down and speed up (e.g., stutter). For example, some frames of frame set 13 are presented 50 ms apart, while others are displayed 33.3 ms apart. As depicted in FIG. 1A, the frame sets 11 and 13 both include frames f4, f6, and f8 displayed at the same time, both include the same number of frames, and both have the same average frame rate; however, due to the inconsistent timing of frame set 13, the resultant frames are displayed in a jerky manner that substantially impacts the user experience.

In FIG. 1B, a frame timing diagram 20 illustrates the timing of frame sets 21, 22, 23, and 24. FIG. 1B depicts an inconsistent timing of source frames 21 due to frames being dropped. Dropped frames impact smoothness due to the resultant gap between displayed frames. For example, frame set 22 includes two instances of a single dropped frame. Frequently dropping a single frame results in small hitches during playback. Frames 23 include several dropped frames in a row, which results in a large hitch during playback, substantially impacting the smoothness of the resultant image. Frames 24 depict a similar large hitch during playback; however, in frames 24, the hitch is caused by a long animation time between frames. Due to the relatively long animation time, the smoothness of the resultant animation is impacted in the same way as the dropped frames of frame set 23. Therefore, one object of the present invention is to prevent inconsistent animation times that may result in hitches by dynamically adjusting the animation time and storing rendered frames in a post-render queue.

In FIG. 1C, a frame timing diagram 30 illustrates the timing of frames 31 and 32. Frame timing diagram 30 includes frame data 31 generated by a 3D gaming application according to an animation time. The animation time indicates the time difference in the underlying simulation between capturing two frames. The frame data 31 is rendered by a GPU, and the resultant frames 32 are passed to a display device for display according to a flip time. The flip time indicates the amount of time that passes between the display of two frames. When the flip time used to display the frames differs from the animation time used to generate the frames, stutter may occur. Further, as depicted in FIG. 1C, stutter may occur when the GPU is unable to deliver frames in a timely manner. Even when the application or GPU is able to deliver frames in a timely manner, a relatively large animation time between frames can cause a hitch in the resultant animation.

What is needed is a device and method capable of mitigating hitches and stutter by ensuring that frames are displayed in a smooth, consistent manner.

SUMMARY OF THE INVENTION

Embodiments of the present invention provide end-to-end frame time synchronization for improving smoothness when displaying frames of 3D applications to mitigate hitches and stutter, thereby improving the user experience.

Accordingly, a device and method for providing end-to-end frame time synchronization are provided herein. Embodiments of the present invention provide feedback to an application that generates frame data (e.g., a game engine) for adjusting the animation time used by the application to generate new frames. By increasing the animation time between frames, fewer frames are used to represent a given time period in the underlying simulation, and by decreasing the animation time, more frames are used to represent the same period of time. A post-render queue is used to hold completed frames before display, including an animation timestamp, and a flip control thread is executed to synchronize the display of completed frames with the frame's animation time. The post-render queue is actively managed to control the display or output rate of the post-render queue by adjusting the animation time used by the application to produce new frames. The adjusted animation time is sent as feedback to the application and the application produces new frame data using the adjusted animation time. Every frame submitted is tagged with the time advancement (e.g., animation time) the application used to simulate the frame. Management blocks then honor the time advancement and scan out frames to the monitor at the rate they were simulated. Therefore the system allows frames to be displayed according to their animation times, rather than render times, to thereby reduce visual stutter.

According to one embodiment, a system for mitigating display artifacts is disclosed. The system includes a processor executing instructions of a rendering engine, and the instructions cause the processor to generate frame data. The frame data includes a timestamp representing the animation time associated with the frame data. The system further includes a graphics processing unit that renders the frame data to generate rendered frames, a post-render queue memory that stores the rendered frames, and a queue management unit that measures a fill rate and a drain rate of the post-render queue memory, calculates an adjusted animation time based on the fill rate and the drain rate, and provides the adjusted animation time to the rendering engine. A flip control unit is included to scan out the rendered frames from the post-render queue memory at a flip time for display thereof, and to dynamically adjust the flip time to be equivalent to the adjusted animation time to thereby reduce visual stutter.

According to one embodiment, the adjusted animation time is calculated by the queue management unit to adjust an amount of frame time stored in said post-render queue.

According to one embodiment, the adjusted animation time is calculated to eliminate perceptible graphical stutter.

According to one embodiment, the adjusted animation time is increased responsive to determining that the fill rate has decreased, and where the adjusted animation time is decreased responsive to determining that the fill rate was increased.

According to one embodiment, the system includes a pre-render queue that receives the frame data from the processor, stores the frame data, and transmits the frame data to the graphics processing unit.

According to another embodiment, a method of buffering rendered frames to mitigate stutter is disclosed. The method includes receiving frame data at a driver of a graphics processing unit (GPU), where the frame data includes a timestamp representing an animation time used to generate the frame data, rendering the frame data at the GPU to generate a rendered frame, storing the rendered frame in a post-render queue, and scanning out the rendered frame to a display device to cause the display device to display the rendered frame. The scanning out of the rendered frame is performed using a first flip time equivalent to the animation time. The method further includes calculating an adjusted animation time for rendering subsequent frames based on a frame time stored in the post-render queue, receiving new frame data at the driver of the GPU, where the new frame data is generated using the adjusted animation time, rendering the new frame data at the GPU to generate a new rendered frame, storing the new rendered frame in the post-render queue, and scanning out the new rendered frame to the display device to cause the display device to display the new rendered frame, where scanning out the new rendered frame is performed using a second flip time, and where the second flip time is equivalent to the adjusted animation time.

According to another embodiment, a method of executing a rendering engine to mitigate stutter is disclosed. The method includes generating first frame data, where the first frame data includes a timestamp representing an animation time used to generate the first frame data, and providing the first frame data to a driver of a graphics processing unit, where the GPU renders the first frame data to generate a first rendered frame and stores the first rendered frame in a post-render queue. The method also includes receiving an adjusted animation time from the queue management unit, and generating second frame data using the adjusted animation time, where the second frame data includes a timestamp representing the adjusted animation time, and where the adjusted animation time is calculated by the queue management unit to mitigate stutter when frames are popped from the post-render queue and displayed.

According to one embodiment, the method further includes providing the second frame data to the driver of the GPU, where the GPU renders the second frame data to generate a second rendered frame and stores the second rendered frame in the post-render queue, and providing the adjusted animation time to a flip control unit, where the flip control unit scans out the second rendered frame to cause the second rendered frame to be displayed on a display device, where the flip control unit scans out the second rendered frame based on a flip control time equivalent to the adjusted animation time.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1A:
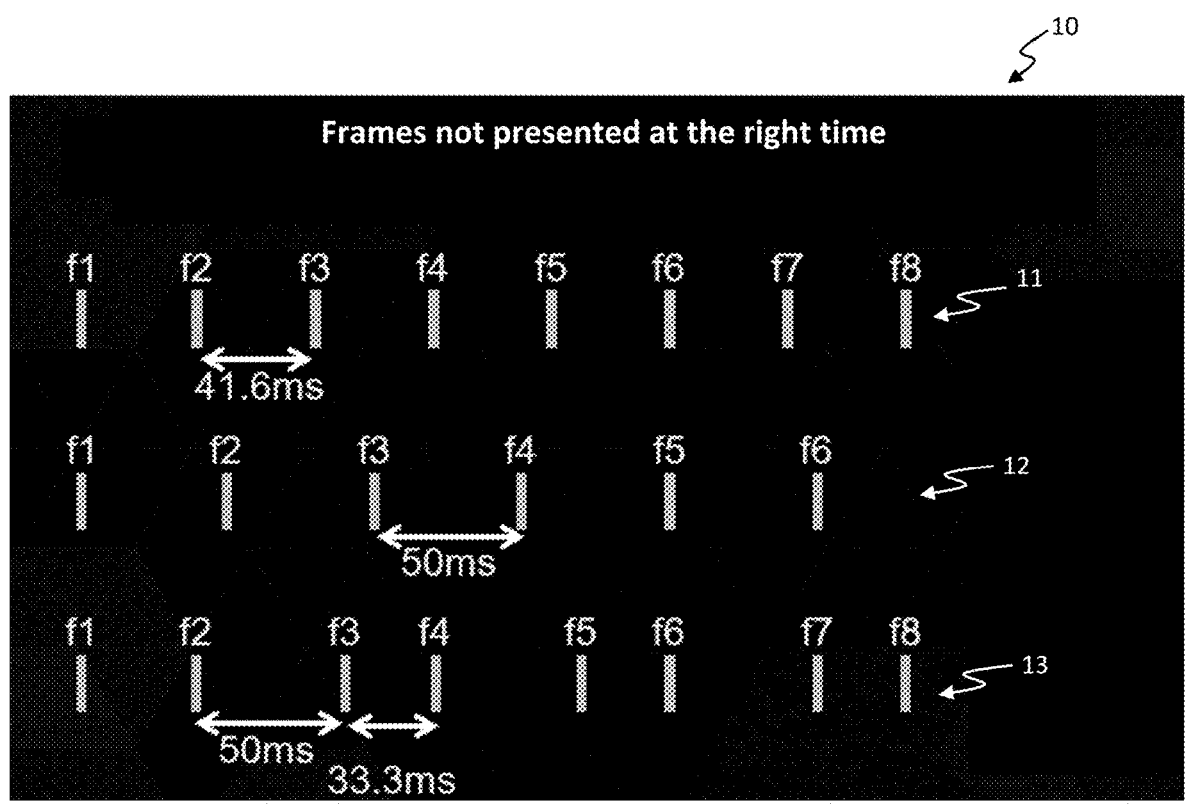
FIG. 1A is a frame timing diagram depicting frames that are not presented at the correct time.
Figure 1B:
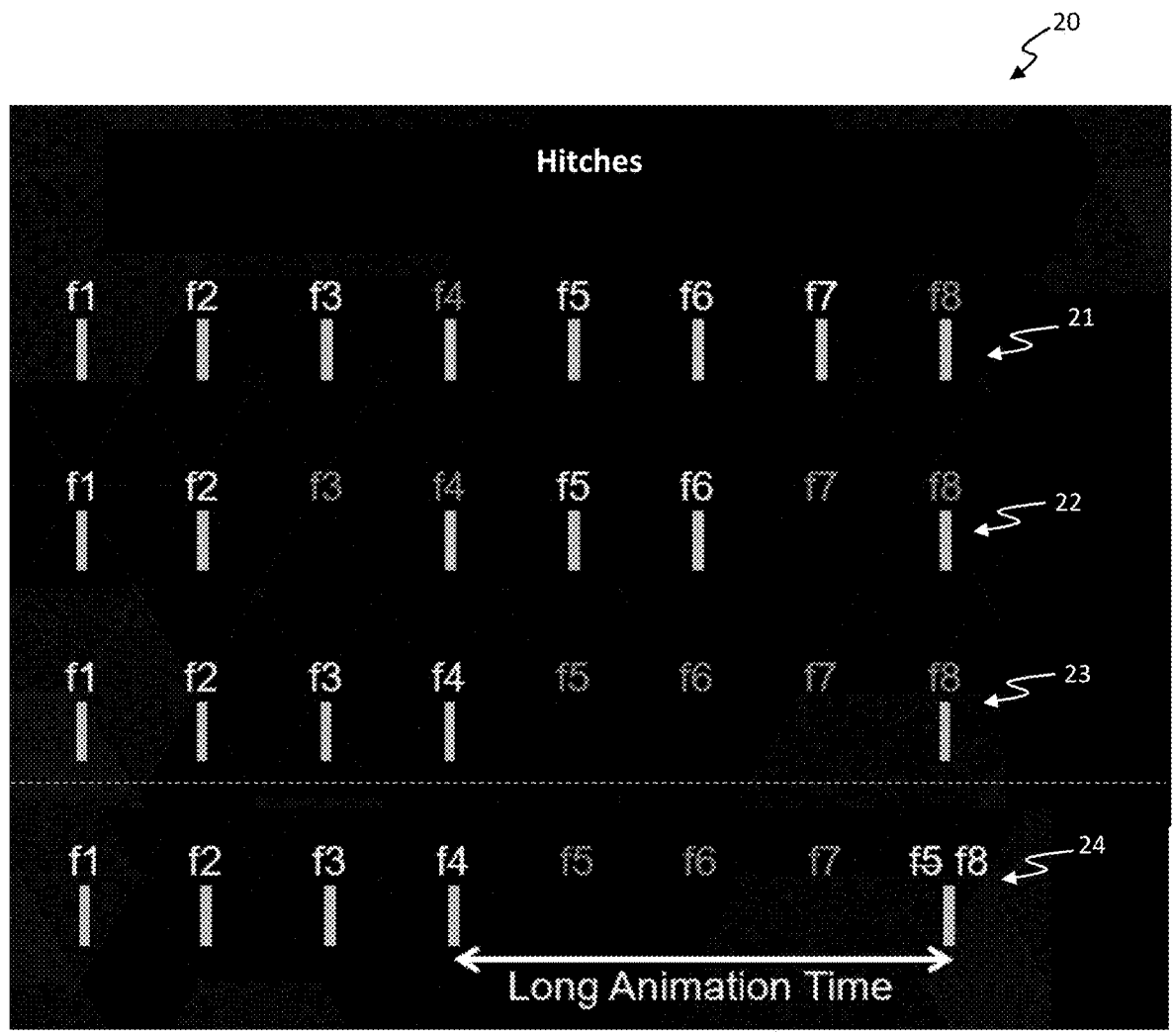
FIG. 1B is a frame timing diagram depicting hitches caused by dropped frames or long animation times.
Figure 1C:
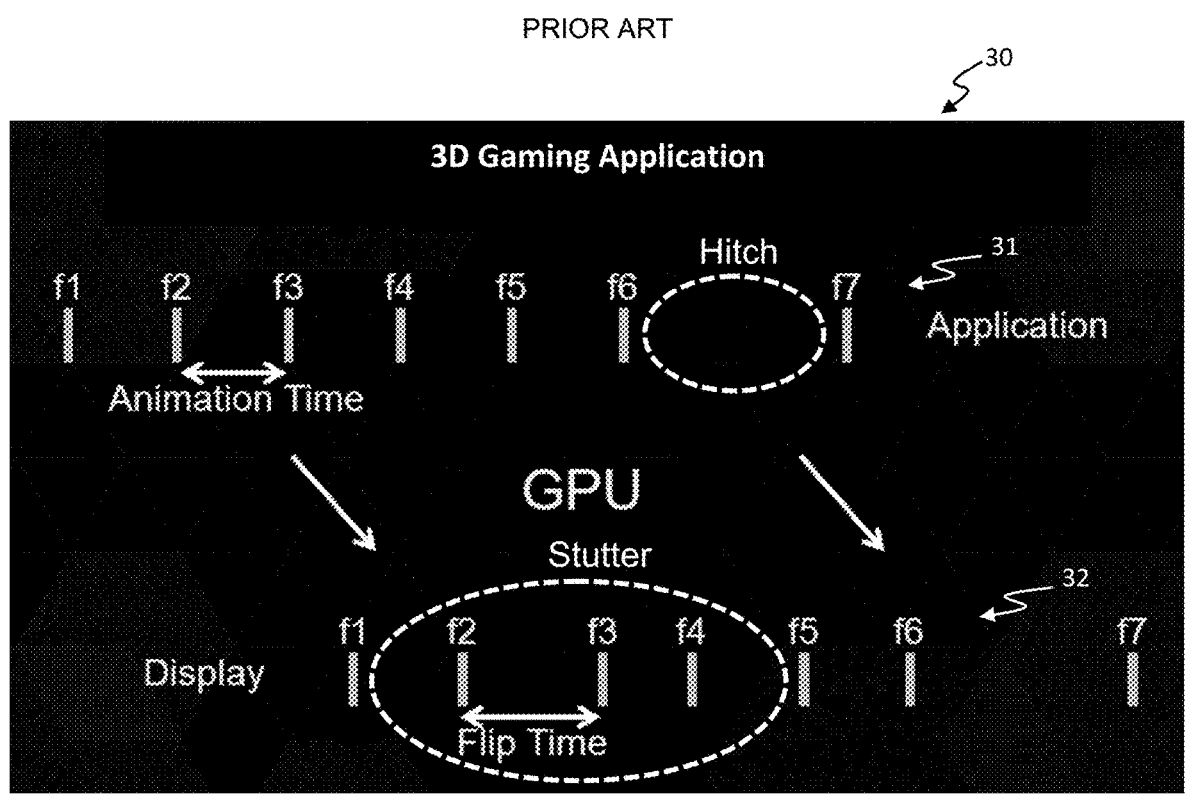
FIG. 1C is a frame timing diagram of frame data generated by a 3D gaming application according to an animation time, rendered by a GPU, and displayed on a display device according to a flip time.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIGS. 3A, 3B, 4A, and 4B) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "displaying," "writing," "including," "storing," "rendering," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Frame Time Smoothing Based on Modified
Animation Advancement and Use of Post Render
Queues Solutions for providing end-to-end frame time synchronization are provided herein. Embodiments of the present invention enable feedback to be provided to a game engine for adjusting the animation time used to generate future frames. A post-render queue is used to temporarily hold completed frames, and a flip control thread is executed to synchronize when the completed frames are displayed based on the frame's animation time to reduce and/or eliminate perceptible stutter.

Figure 2A:
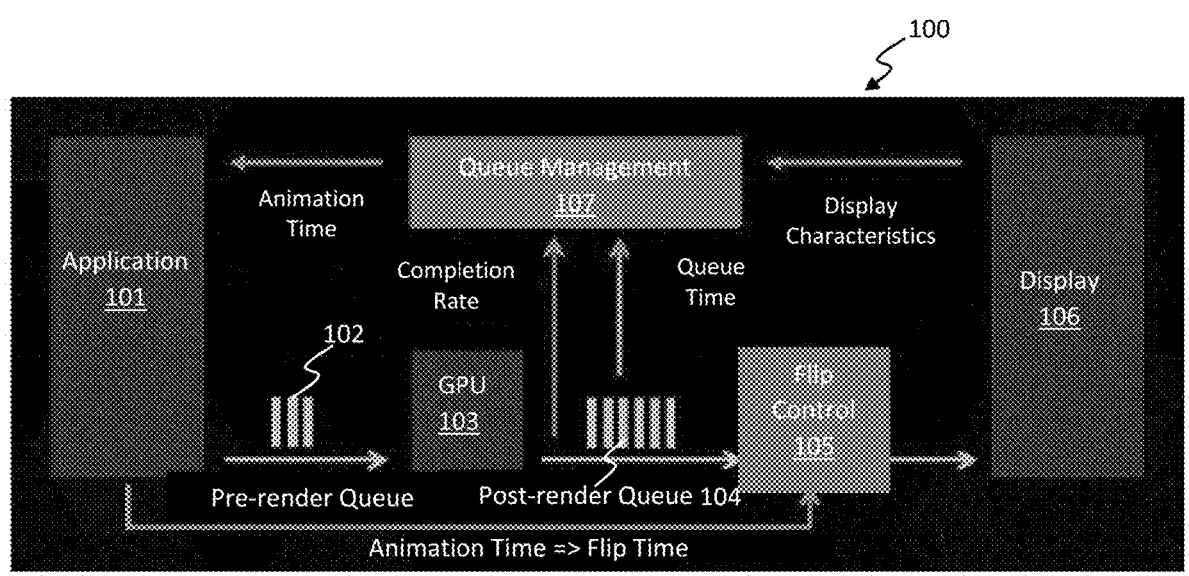
FIG. 2A is a block diagram of an exemplary device for providing end-to-end frame time synchronization to improve the smoothness of displayed frames according to embodiments of the present invention.

FIG. 2A depicts an exemplary device 100 for providing end-to-end frame time synchronization using a post-render queue 104 according to embodiments of the present invention. An application 101 (e.g., a 3D graphics gaming application or a game engine) tags each frame produced by the application with the animation time used to generate the frame. The animation time indicates how far in time the underlying simulation executed by the game engine 101 is advanced in accordance with its game simulation environment or physics. Based on the tagged animation time, a flip control thread 105 takes frames from the post render queue and triggers the display (e.g., flip) of each frame at the appropriate time on display device 106, thereby ensuring that the frame's flip time matches the tagged animation time to produce a smooth visual result.

It is appreciated that a post-render queue 104 is provided so that new frames are buffered to mitigate or prevent micro-stutter The post-render queue 104 is managed (e.g., by adjusting the animation time) so that a sufficient amount of frame time is stored in the queue at any given time. For example, when the queue 104 stores 10 frames having 1 ms animation time, the frame time in the queue 104 is 10 ms; if the queue 104 stores 1 frame having 10 ms animation time, the frame time in the queue 104 is also 10 ms. As such, rendered frames stored in the queue 104 can be used as a buffer for displaying data when subsequent frames are not rendered in time, thereby reducing graphical stutter. It should be further appreciated that holding a relatively large amount of frame time in the post-render queue 104 will increase input latency, making the application 101 slower to respond to user input. Maintaining a sufficient amount of frame time in the post-render queue 104 to effectively mitigate hitches and stutter while preventing substantial input lag is one object of the present invention. According to some embodiments, the fill rate of the queue equals the inverse of the frame render time, and future frame render times are estimated based on past frame render times (e.g., an average frame render time).

A queue management unit 107 is provided to monitor and manage the amount of frame time stored in the post-render queue 104. The management of post-render queue 104 may be accomplished by determining the amount of time taken to render a completed frame and the total amount of frame time stored in the queue. The status of the queue may be provided to the queue management unit 107 by the post-render queue 104.

The drain rate of the queue can be adjusted by the queue management unit to control the amount of frame time stored in the post-render queue, and in this way, an appropriate amount of frame time will be queued at any given time to effectively mitigate stutter. To adjust the drain rate of the post-render queue 104, the queue management unit 107 can adjust the animation time used by the application for future frames. A longer animation time means that the frames will be displayed for a longer period of time, and therefore, the drain rate of the post-render queue is reduced. If a shorter animation time is provided to the application 101 by the queue management unit 107, the completed frames are displayed for a shorter period of time, and the drain rate of the post-render queue 104 is increased.

Importantly, the queue management unit 107 of FIG. 2A is configured to provide feedback to the application 101 for adjusting the animation time used to render subsequent frames. Specifically, the animation time is determined by the queue management unit 107 based on the state of the post-render queue 104, and the queue management unit 107 provides the application 101 with a specific animation time to use for rendering new frames. For example, if the post-render queue 104 holds a relatively small amount of frame time, the queue management unit 107 can instruct the game engine to use a larger animation time. In this way, the frames will be held in the post-render queue 104 for a longer period of time, thereby decreasing the drain rate, and the post-render queue 104 will be expected to store a greater amount of frame time. If the post-render queue 104 is holding a relatively large amount of frame time, the queue management 107 unit can instruct the application 101 to use a shorter animation time, and the frames will be popped from the post-render queue 104 at a faster rate, thereby reducing the frame time in the post-render queue and avoiding undesirable input lag. A pre-render queue 102 is provided for buffering the command stream between the game engine and the GPU. The command stream includes instructions used by the GPU 103 for rendering new frames (e.g., frame data).

Importantly, a flip control thread 105 pops completed frames from the post-render queue 104 and provides the completed frames to a display device 106 for display. The flip control thread 105 determines the flip time for a given frame based on the animation time of the frame as tagged by application 101. In this way, the flip control thread 105 can ensure that the flip time of a frame substantially equals the animation time of the frame, thereby producing a smooth, consistent image, which advantageously eliminates perceptible visual stutter.

According to some embodiments, the display device 106 provides the queue management unit 107 with display characteristics of the display device, and the display characteristics are used to adjust the animation time so that subsequent flip times of frames displayed on display device 106 align with a compatible refresh rate of the display device 106. For example, the display device 106 may indicate compatible refresh rates, or if G-Sync or V-Sync are active, and the animation time is adjusted accordingly.

It is appreciated that the pre-render queue 102 and the post-render queue 104 may be implemented in computer memory to temporarily store frame data and rendered frames, respectively. The GPU 103 includes a processor capable of rendering frames from frame data, and the display device 106 is a hardware display device capable of visually reproducing the rendered frames. Other components of device 100 may be implemented as software or logic.

Figure 2B:
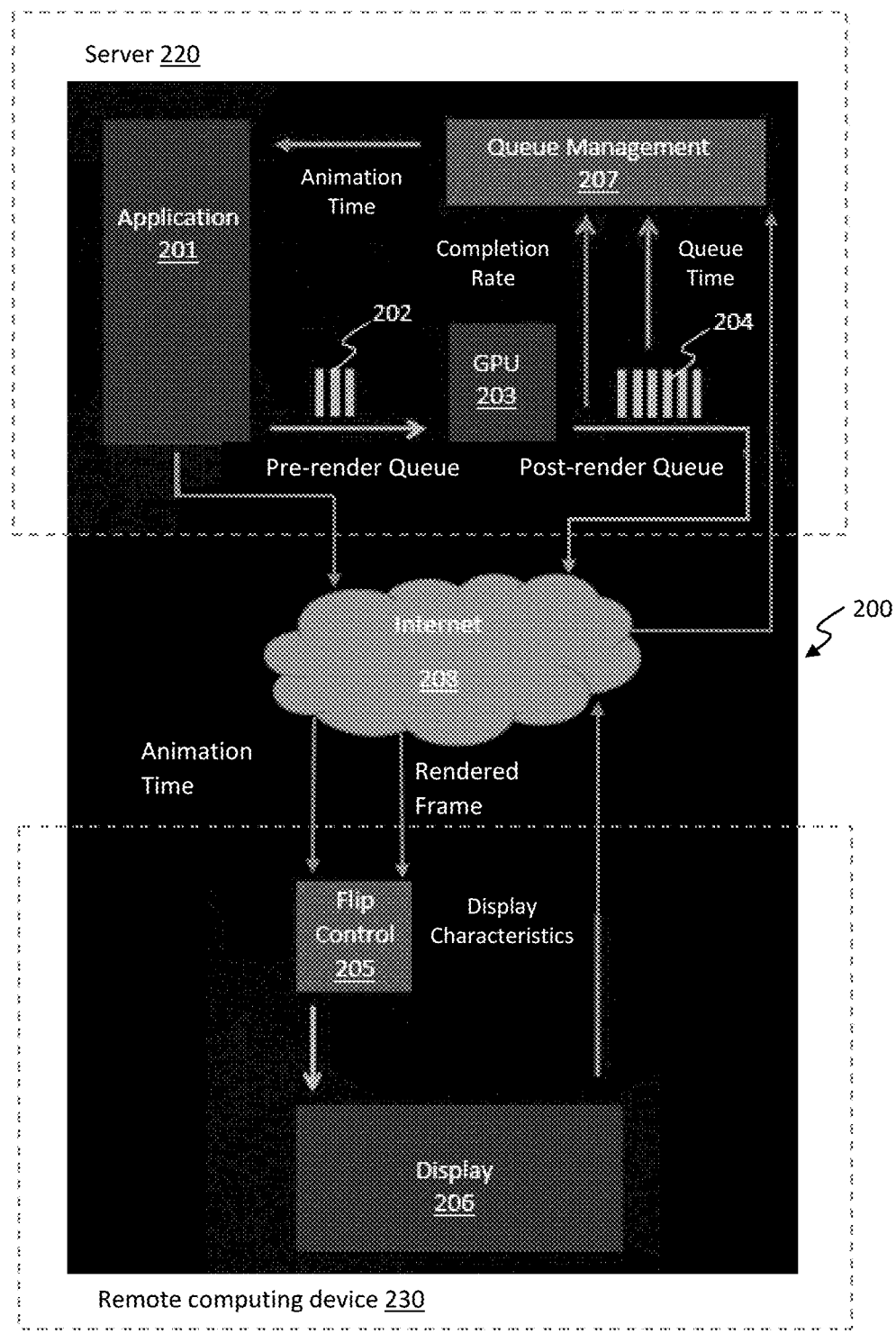
FIG. 2B is a block diagram of an exemplary device for providing end-to-end frame time synchronization to improve the smoothness of frames rendered by a cloud server and transmitted to a computing device (e.g., a mobile or desktop computer) for display according to embodiments of the present invention.

With regard to FIG. 2B, another exemplary system 200 for providing end-to-end frame time synchronization between a remote server 220 and a remote computing device 230 is depicted according to embodiments of the present invention. In this embodiment, the application may reside remote to the display unit. The remote computing device 230 may include a smartphone or tablet, a set top box, such as a gaming console or streaming media player, and, for instance, a display device capable of communicating via the Internet 208. The remote computing device 230 receives frames rendered by the remote server 220 and executes a flip control thread 205 to control when received frames are flipped to the display device 206 for display. The application 201 that produces the frame data provides the flip control thread 205 with the animation time used to produce the frame data, for example, by tagging the frame data with the animation time. According to some embodiments, the display device 206 provides the server 220 with display characteristics of the display device, and the display characteristics are used by the queue management unit 207 to adjust the flip time of frames received from the server 220 via the Internet 208.

Server 220 executes the application 201 (e.g., a 3D graphics game engine) to generate frame data, and can tag the frame data with metadata including the animation time used to generate the frame data. Animation time may also be referred to as simulation time. As is well-known, the animation time of a frame is the time the frame is associated with relative to the underlying simulation of the application. The frame data is added to a pre-render queue 202 until the GPU is ready to render the frame. At that time, the frame data is popped from pre-render queue 202 by GPU 203 and subsequently rendered into a frame. The rendered frame is added to a post-render queue 204 with its animation time. When the flip control thread 205 determines that a new frame should be flipped to the display device 206, a rendered frame is popped from the post-render queue 204 and provided to the remote computing device 206 via the Internet 208. The received rendered frame is then displayed on the display device 206 according to the frame's flip time.

The post render queue 204 is managed by a queue management unit 207 in the same way as described above with regard to FIG. 2A. For example, queue management unit 207 monitors and manages the post-render queue 204 so that a sufficient amount of frame time is stored in the post-render queue 204. The management of post-render queue 204 may be accomplished by determining the amount of time taken to render a completed frame and the frame time stored in the queue, and adjusting the animation time of new frames such that a sufficient amount of frame time is stored in the queue to mitigate graphical stutter.

According to some embodiments, the frames are sent to the remote computing device as packets, and the packets include a timestamp representing the frames animation time.

According to some embodiments, the mobile computing device includes a post-render queue, and the animation time for rendering subsequent frames is adjusted based on the time required to transmit a packet from the remote server to the mobile computing device.

According to some embodiments, the application that generates frame data may not be capable of receiving animation time feedback from the queue management unit. Generally, applications (e.g., game engines) are configured to generate frames using an animation time that coincides with the average time required for the GPU to render a new frame. For example, some game engines maintain a rolling average of the time required to render previously rendered frames. The rolling average render time is updated each time a new frame is rendered, and the animation time of a subsequent frame is set based on the rolling average render time. To adjust the animation time for applications that are not designed to accept animation time feedback, the GPU may be configured to provide an adjusted, inaccurate representation of the render time of previous frames. In this way, the GPU can alter the average render time observed by the application, and thus, the animation time used by the application to produce new frames increases or decreases according to the inaccurate render time that is provided to the application.

According to some embodiments, when adjusting the animation time used to render subsequent frames, the queue management unit considers the display characteristics of the display device used to display the rendered frames. The display device can provide display characteristic information directly to the queue management unit. For example, when frames are rendered to the display using Vertical Sync (V-Sync), the animation time should be a multiple of the display refresh interval. For example, for a display capable of refreshing every 16.6 ms, with V-Sync enabled, a new frame should be flipped to the display every 16.6, 33.2, or 49.8 ms to sync with the displays refresh rate.

For G-Sync capable displays, for instance, the animation time of a frame should conform to a range of refresh rates supported by the display. For example, a G-Sync capable display may be configured to display new frames every 7 to 30 ms. The animation time used to generate frames therefore should be equal to or larger than the display's minimum refresh interval. Accordingly, the animation time can be adjusted so that the display of the frame better aligns with the range of refresh rates supported by the display device. For example, for a G-Sync capable display during scan out, the animation time of a subsequent frame may be adjusted by between 7 and 16 ms roughly every 33 ms, and in this way, a new frame will be provided to the display at a rate supported by the display device. Alternatively, the animation time of a frame can be adjusted using DC balancing or prediction algorithms, for example.

For multi-GPU configurations using a Scalable Link Interface (SLI), alternate frame rendering (AFR) may instruct one GPU to render frames 0, 2, 4, and 6, and another GPU to render frames 1, 3, 5, and 7, for example. In this way, according to some embodiments of the present invention, the rendering of frames is coordinated between GPUs such that the flip times used by the GPUs are relatively even, and the resultant frames are displayed in the correct order.

Figure 3A:
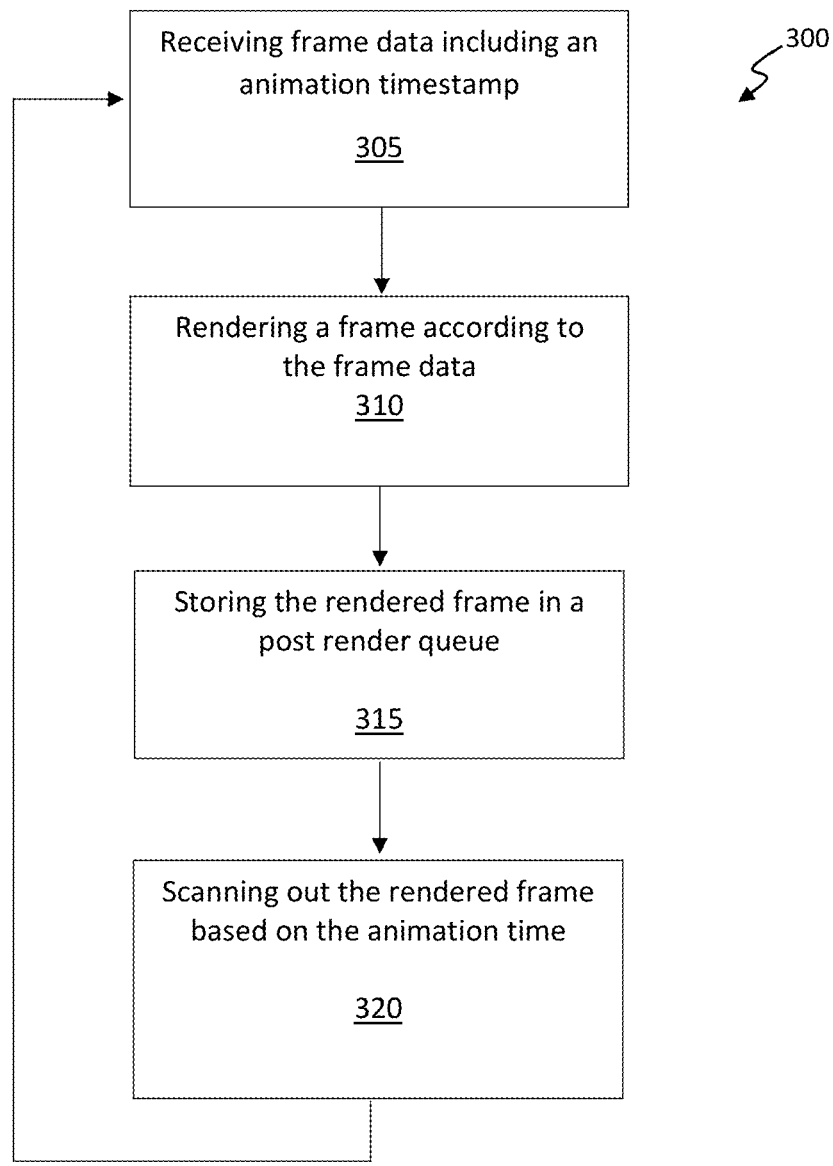
FIG. 3A is a flow chart depicting an exemplary sequence of computer implemented steps for scanning out a rendered frame based on a tagged animation time according to embodiments of the present invention.

With regard to FIG. 3A, a flowchart depicting an exemplary sequence of computer implemented steps 300 for scanning out new frames synchronized with the animation time used to render the frames is depicted according to embodiments of the present invention. Beginning at step 305, frame data including an animation timestamp is received at a GPU, or at a pre-render queue thereof. At step 310, a new frame is rendered by the GPU according to the frame data. At step 315, the rendered frame is added to a post-render queue. At step 320, the rendered frame is popped from the post-render queue and scanned out to a display device according to the animation timestamp. For example, step 320 may include receiving a control signal from a flip control thread indicating that a new frame should be displayed on the display device according to the animation timestamp such that the flip time of the new frame is approximately equal to the animation time indicated by the animation timestamp. The sequence 300 then returns to step 305, where new frame data is received and subsequently rendered.

Figure 3B:
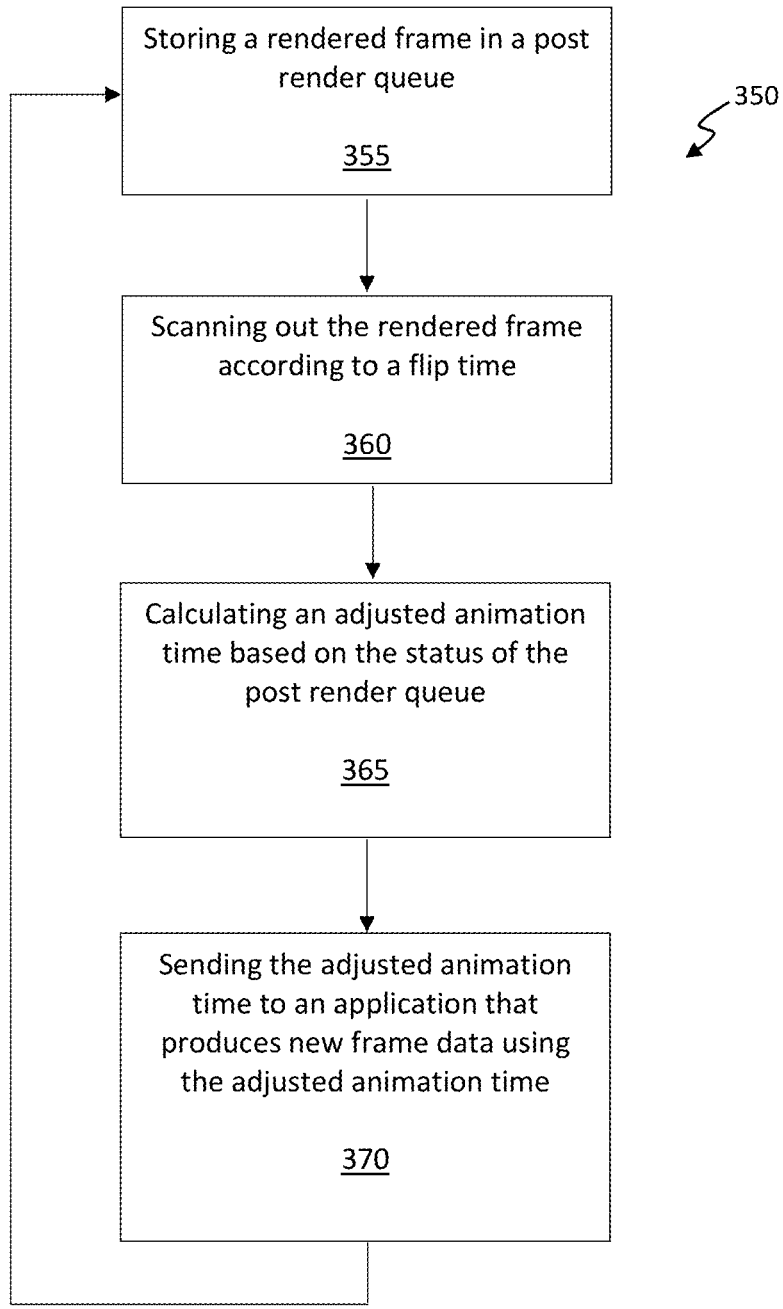
FIG. 3B is a flow chart depicting an exemplary sequence of computer implemented steps for managing a post-render queue by adjusting an animation time used to render new frames according to embodiments of the present invention.

With regard to FIG. 3B, a flowchart depicting an exemplary sequence of computer implemented steps 350 for managing a post-render queue to mitigate graphical stutter when displaying rendered frames is depicted according to embodiments of the present invention. At step 355, a frame rendered by a GPU is stored in a post-render queue. At step 360, a frame resident in the post-render queue is scanned out to a display device based on the frame's flip time. A flip control thread is executed to synchronize the frame's flip time with the animation time used to produce the frame. At step 365, after the frame is popped from the post-render queue, a queue management unit observes the status of the post-render queue to determine if the animation time used to generate a subsequent frame should be adjusted. For example, the queue management unit may receive the frame completion rate and the frame time stored in the queue from the GPU to determine the status of the post-render queue.

At step 370, the adjusted animation time is sent as feedback to an application that produces new frame data using the adjusted animation time. As described above with regard to FIG. 2A, if the post-render queue holds relatively small frame time, the queue management unit can instruct the application to use a larger animation time. In this way, the frames will be held in the post-render queue for a longer period of time, thereby decreasing the drain rate of the post-render queue, and the post-render queue will be expected to store a greater amount of frame time in the queue. If the post-render queue is holding a relatively large amount of frame time, the queue management unit can instruct the application to use a shorter animation time, and the frames will be popped from the post-render queue at a faster rate, thereby reducing the amount of frame time in the post-render queue and avoiding undesirable input lag. The sequence 350 returns to step 355, where the rendered frame is added to the post render queue, and steps 360-470 are repeated.

Figure 4A:
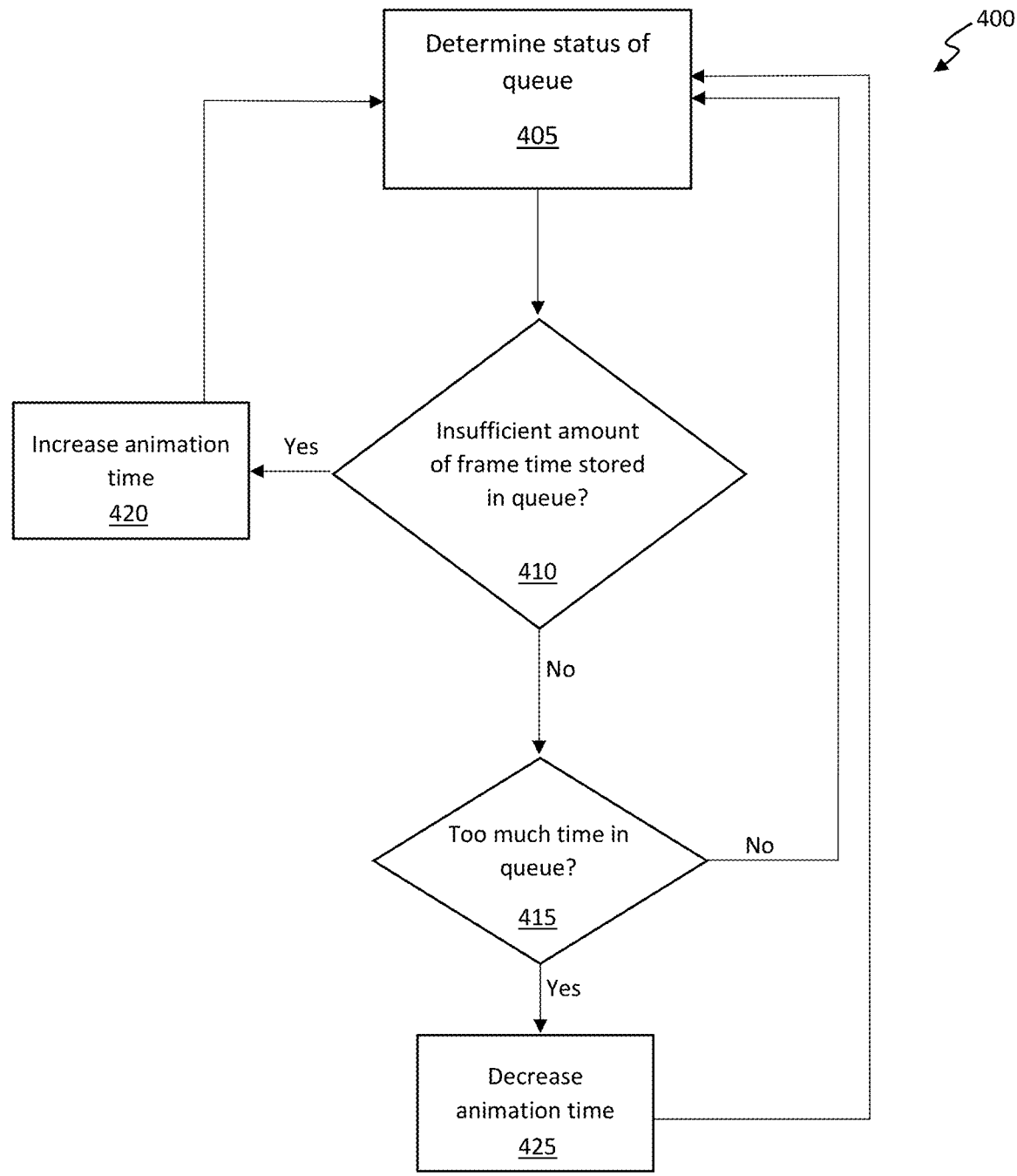
FIG. 4A is a flow chart depicting an exemplary sequence of computer implemented steps for adjusting an animation time used to produce new frame data responsive to a status of a post-render queue according to embodiments of the present invention.

With regard to FIG. 4A, a flow chart illustrating an exemplary sequence of computer implemented steps 400 for adjusting an animation time used to produce new frame data responsive to a status of a post-render queue is depicted according to embodiments of the present invention. At step 405, the status of a post-render queue is determined using a queue management unit, for example, by measuring the fill rate of the post-render queue (corresponding to the completion rate of the GPU) and the amount of frame time stored in the post-render queue. It is to be appreciated that when the animation time is greater than the render time, the queue time increases, and when the animation time is smaller than the render time, the queue time decreases.

At step 410, based on the status of the post-render queue, it is determined if there is a sufficient amount of frame time stored in the post-render queue. According to some embodiments, the amount of frame time sufficient for preventing stutter is determined based a confidence level for predicting the future fill rate of the queue, rather than the actual fill rate. Render time may vary dynamically based on frame complexity, processor performance, and other external factors. As such, the amount of frame time to store in the queue can be determined based on the confidence level for predicting the render time of future frames. The confidence level is dynamically adjusted over time based on the consistency with which frames are generated. The higher the confidence level that frames will be produced at a consistent rate, the less time is needed in the queue, and the lower the confidence level that frames will be produced at a consistent rate, the more time is needed in the queue. For example, even if the fill rate is relatively low, a relatively low queue time may be sufficient to mitigate stutter if the fill rate is consistent, and therefore the confidence level for predicting the future fill rate of the queue is high. On the other hand, if the fill rate varies considerably, a sufficient amount of frame time in queue for preventing stutter is relatively high, even if the current fill rate is already relatively high.

Accordingly, at step 410, if there is an insufficient amount of frame time in the queue, the animation time used to generate new frames is increased at step 420. In this way, the drain rate of the post-render queue is reduced, and the post-render queue is expected to store more frames so that subsequent unpredictable or inconsistent render times do not empty the post-render queue and induce graphical stutter. It is to be appreciated that queueing excessive frame time results in additional input latency. For example, according to some embodiments, the queue time is limited to a maximum queue time of 25 ms to prevent additional input latency.

If step 410 determines that there is enough time in the queue, based on the status of the post-render queue, it is determined at step 415 if there is too much frame time stored in the post-render queue. With too much frame time stored in the post-render queue, at step 425, the animation time used to generate new frames is decreased, thereby increasing the drain rate of the post-render queue. When the confidence level for predicting the future fill rate of the queue is relatively high and the drain rate of the post-render queue is increased, the frame time stored in the post-render queue is expected to decrease, thereby reducing input latency.

Figure 4B:
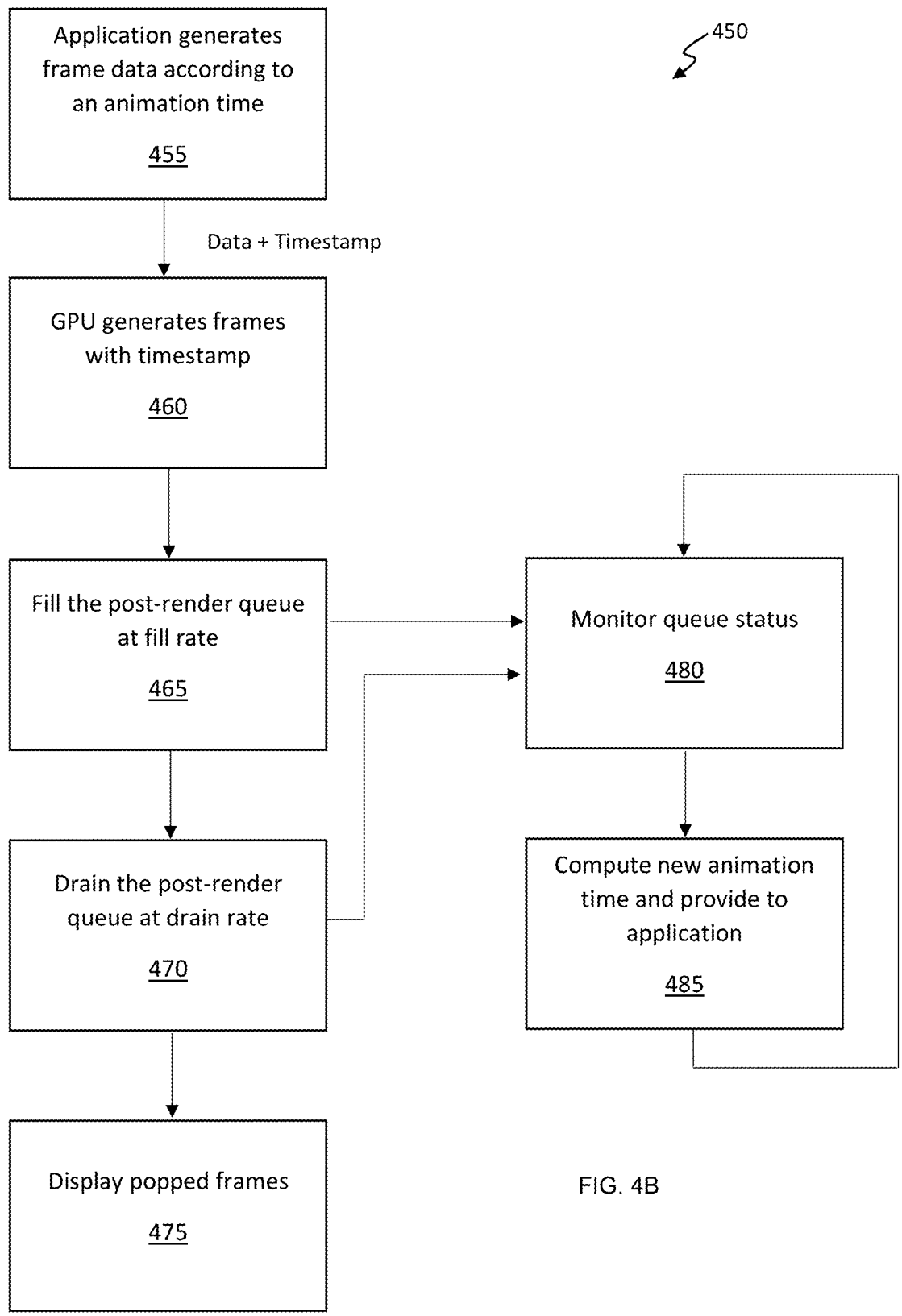
FIG. 4B is a flow chart depicting an exemplary sequence of computer implemented steps for providing end-to-end frame time synchronization to improve the smoothness of displayed frames according to embodiments of the present invention.

With regard to FIG. 4B, a flow chart illustrating an exemplary sequence of computer implemented steps 450 for providing end-to-end frame time synchronization to improve the smoothness of displayed frames is depicted according to embodiments of the present invention. At step 455, an application (e.g., a 3D gaming graphics engine) generates frame data according to an animation time. At step 460, a GPU receives the frame data, including an animation timestamp, and generates frames tagged with the timestamp. At step 465, the GPU stores the rendered frames in a post-render queue at a fill rate. At step 470, the frames stored in the post-render queue are drained from the post-render queue at a drain rate. At step 475, the frames popped form the post-render queue are displayed on a display device using a flip time corresponding to the tagged animation timestamp. In preferred embodiments, the flip time used to trigger the display of a frame is equivalent or substantially equivalent to the tagged animation timestamp. While steps 455-475 are performed, at step 480, a queue management unit or thread monitors the status of the post-render queue (e.g., fill rate and frame time of the post-render queue). At step 485, based on the status of the post-render queue, a new animation time is computed for generating new frames, and the new animation time is provided to the application. Steps 480-485 are repeated to continuously monitor the post-render queue and adjust the animation time for new frames accordingly.

Exemplary Computer System

Embodiments of the present invention are drawn to computer systems for mitigating graphical hitches and stutter by ensuring that rendered frames are displayed in a smooth, consistent manner. The following discussion describes such exemplary computer systems.

Figure 5:
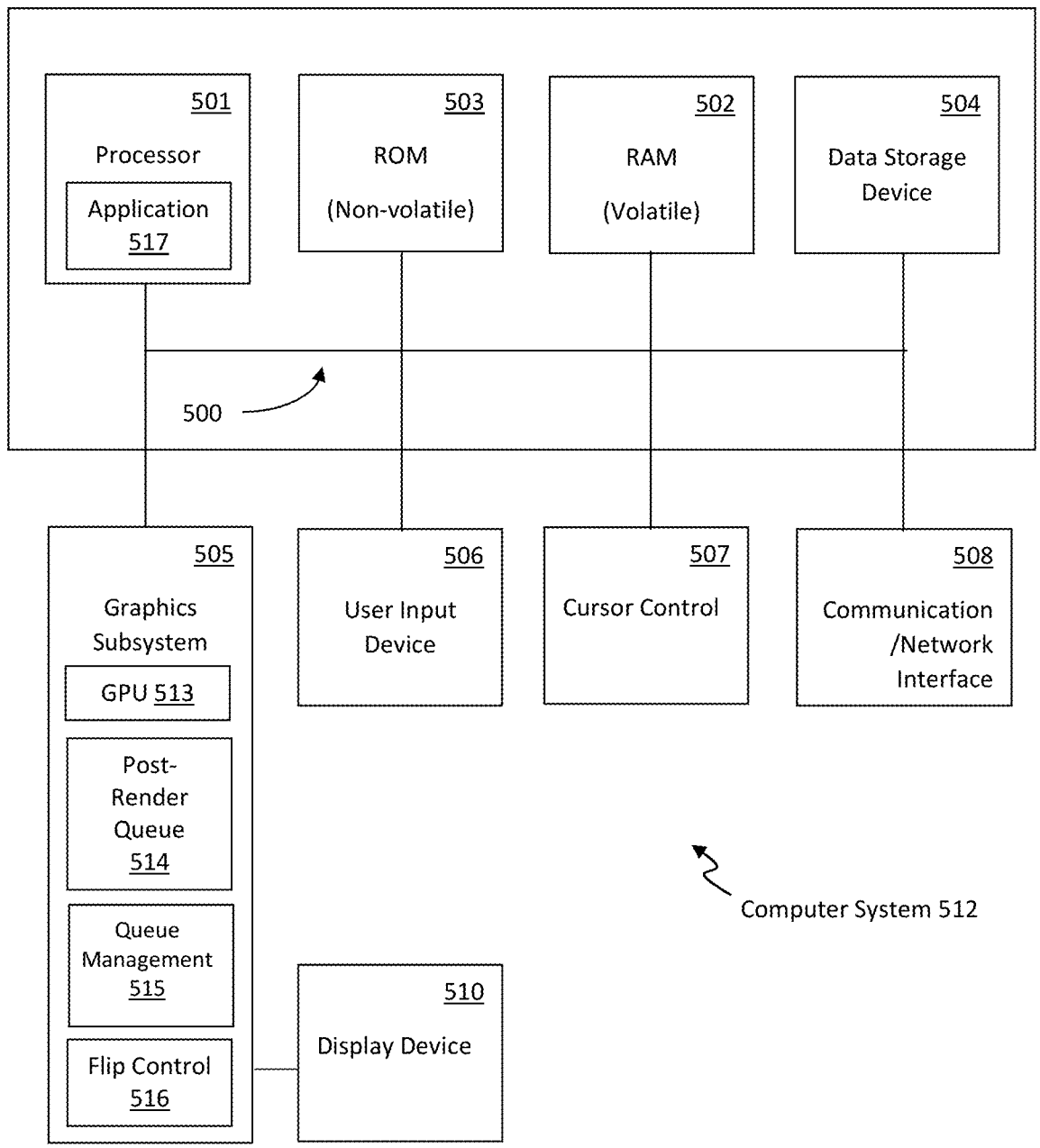
FIG. 5 is a block diagram of an exemplary computer system upon which embodiments of the present invention may be implemented.

In the example of FIG. 5, the exemplary computer system 512 includes a central processing unit (CPU) 501 for running software applications (e.g., 3D application 517) and optionally an operating system. Random access memory 502 and read-only memory 503 store applications and data for use by the CPU 501. Data storage device 504 provides non-volatile storage for applications and data and may include fixed disk drives, removable disk drives, flash memory devices, and CD-ROM, DVD-ROM or other optical storage devices. The optional user inputs 506 and 507 comprise devices that communicate inputs from one or more users to the computer system 512 (e.g., mice, joysticks, cameras, touch screens, and/or microphones).

A communication or network interface 508 allows the computer system 512 to communicate with other computer systems, networks, or devices via an electronic communications network, including wired and/or wireless communication and including an Intranet or the Internet. The display device 510 may be any device capable of displaying visual information in response to a signal from the computer system 512 and may include a flat panel touch sensitive display, for example. The components of the computer system 512, including the CPU 501, memory 502/503, data storage 504, user input devices 506, and graphics subsystem 505 may be coupled via one or more data buses 500.

In the embodiment of FIG. 5, a graphics subsystem 505 may be coupled with the data bus and the components of the computer system 512. The graphics system may comprise a physical graphics processing unit (GPU) 513 and graphics/video memory. GPU 513 may include one or more rasterizers, transformation engines, and geometry engines, and generates pixel data from rendering commands to create output images. The physical GPU 513 can be configured as multiple virtual GPUs that may be used in parallel (e.g., concurrently) by a number of applications or processes executing in parallel, or multiple physical GPUs may be used simultaneously. Graphics subsystem 505 can output display data to display device 510.

The graphics subsystem 505 may be configured to perform end-to-end frame time synchronization to improve smoothness for displaying images of 3D application 517 executed by processor 501. The 3D application 517 runs on processor 501 to generate instructions for the GPU 513 to render frames. The graphics subsystem 505 can provide feedback to the 3D application 517 for adjusting the animation time of new frames, and includes a post-render queue 514 used to store completed frames for mitigating stutter and hitches. A queue management unit 515 manages the post-render queue 514 by observing the status of the post-render queue 515 and adjusting the animation time used by the 3D application 517 to produce new frame data. A flip control thread 516 is executed by the GPU 513 to synchronize the display of new frames with the animation time used to render the frames, thereby producing a smooth, consistent image.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

What is claimed is:

1. A system for mitigating display artifacts, said system comprising:
   a processor executing a graphics application to generate frame data, wherein an animation time is used by said graphics application to generate said frame data;
   a graphics processing unit that renders said frame data to generate rendered frames;
   a post-render queue memory that stores said rendered frames;
   a queue management unit that:
      measures a fill rate and a frame time of said post-render queue memory;
      adjusts said animation time based on said fill rate and said frame time to produce an adjusted animation time; and
      provides said adjusted animation time to said graphics application; and
   a flip control unit that scans out said rendered frames from said post rendered queue memory at a flip time for display thereof and dynamically adjusts said flip time to be equivalent to said adjusted animation time.

2. The system as described in claim 1, wherein said adjusted animation time is calculated by said queue management to adjust the frame time stored in said post-render queue memory.

3. The system as described in claim 1, wherein said adjusted animation time is calculated to eliminate perceptible graphical stutter.

4. The system as described in claim 1, wherein said adjusted animation time is determined based on a confidence level for predicting future frame render times.

5. The system as described in claim 1, further comprising a pre-render queue that:
   receives said frame data from the processor;
   stores said frame data; and
   transmits said frame data to said graphics processing unit.

6. A method of buffering rendered frames to mitigate stutter, said method comprising:
   receiving frame data at a driver of a graphics processing unit (GPU), wherein said frame data is generated by a graphics application using an animation time;
   rendering the frame data at the GPU to generate a rendered frame;
   storing said rendered frame in a post-render queue;
   scanning out said rendered frame to a display device to cause said display device to display said rendered frame, wherein said scanning out said rendered frame is performed using a first flip time, and wherein said first flip time is equivalent to said animation time; and
   adjusting said animation time based on a frame time stored in the post-render queue to produce an adjusted animation time for generating subsequent frame data;
   receiving new frame data at the driver of the GPU, wherein said new frame data is generated by said graphics applications using said adjusted animation time;
   rendering the new frame data at the GPU to generate a new rendered frame;
   storing said new rendered frame in the post-render queue; and
   scanning out said new rendered frame to the display device to cause said display device to display said new rendered frame, wherein said scanning out said new rendered frame is performed using a second flip time, and wherein said second flip time is equivalent to said adjusted animation time.

7. The method as described in claim 6, wherein said calculating an adjusted animation time used to render subsequent frames comprises measuring a fill rate of the post-render queue and a drain rate of the post-render queue.

8. The method as described in claim 7, wherein increasing said animation time decreases said drain rate, and wherein decreasing said animation time increases said drain rate.

9. The method as described in claim 7, further comprising decreasing said animation time to decrease the frame time stored in said post-render queue based on a confidence level for predicting future frame render times.

10. The method as described in claim 7, further comprising increasing said animation time to increase the frame time stored in said post-render queue based on a confidence level for predicting future frame render times.

11. The method as described in claim 6, further comprising providing said adjusted animation time to said graphics application that generates said frame data and said new frame data.

12. The method as described in claim 11, wherein said graphics application comprises a 3D rendering engine.

13. The method as described in claim 6, wherein said animation time is further adjusted based on a refresh rate of said display device wherein the animation time is a multiple of the refresh rate.

14. The method as described in claim 6, wherein said animation time is adjusted dynamically to match an adaptable refresh rate of the display device.

15. The method as described in claim 6, further comprising adjusting the animation time to synchronize said flip time with a refresh rate range of the display device.

16. The method as described in claim 6, wherein said animation time is adjusted to accommodate rendering frames using more than one GPU.

17. The method as described in claim 6, wherein said animation time is adjusted to prevent visual stutters of 100 ms or less.

* * * * *